March 14, 1933.  M. J. WEBER  1,900,964

SCALE

Filed July 22, 1926   6 Sheets-Sheet 1

Inventor:
Mathias J. Weber
By: Munday, Clarke & Carpenter
Attys.

March 14, 1933. M. J. WEBER 1,900,964
SCALE
Filed July 22, 1926 6 Sheets-Sheet 3

Inventor:
Mathias J. Weber
By: Munday, Clarke & Carpenter
Attys:-

March 14, 1933.  M. J. WEBER  1,900,964
SCALE
Filed July 22, 1926  6 Sheets-Sheet 4

Inventor
Mathias J. Weber
By: Munday, Clarke & Carpenter
Attys.

March 14, 1933. M. J. WEBER 1,900,964
SCALE
Filed July 22, 1926 6 Sheets-Sheet 5
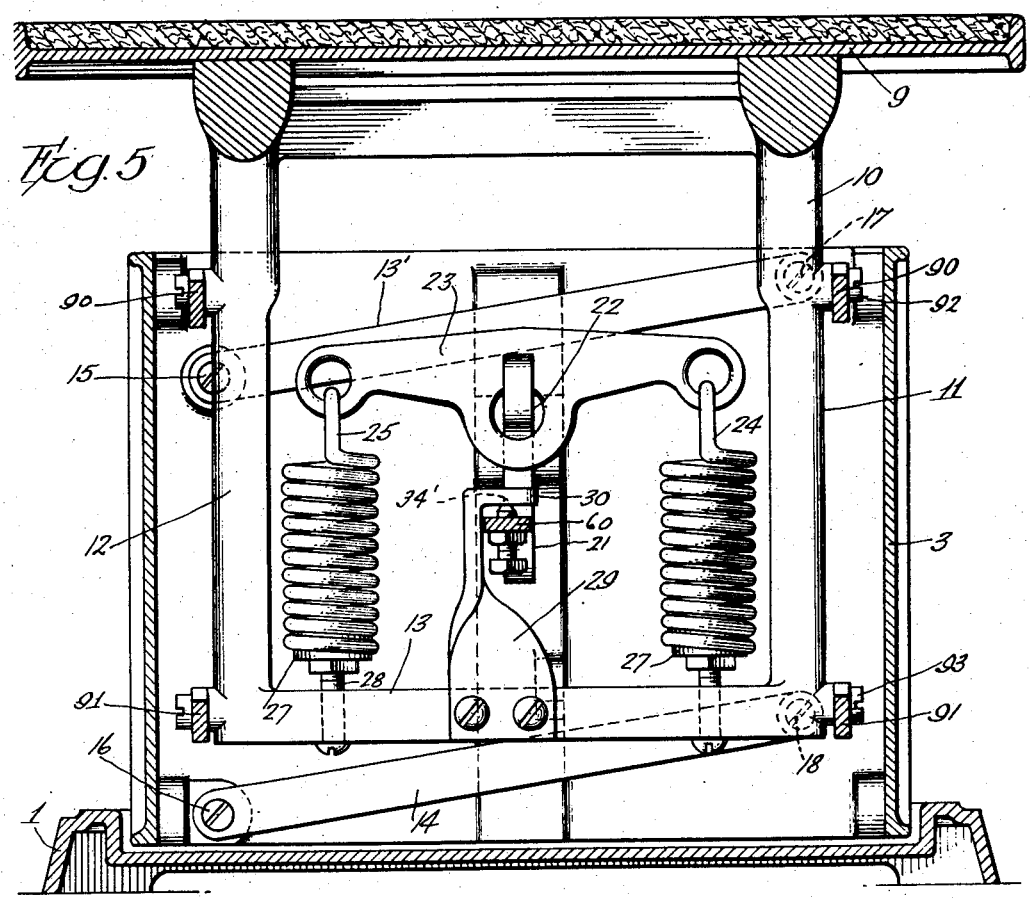
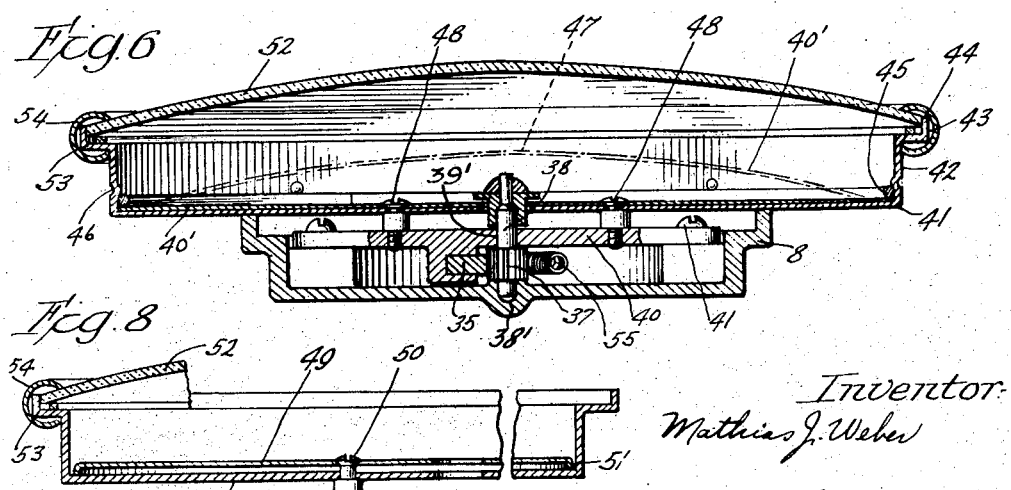
Inventor:
Mathias J. Weber
By: Munday Clarke & Carpenter
Attys.

March 14, 1933.　　　M. J. WEBER　　　1,900,964
SCALE
Filed July 22, 1926　　　6 Sheets-Sheet 6

Inventor
Mathias J. Weber
Munday, Clarke &
Carpenter　Attys.

Patented Mar. 14, 1933

1,900,964

UNITED STATES PATENT OFFICE

MATHIAS J. WEBER, OF CHICAGO, ILLINOIS, ASSIGNOR TO THE HEALTH-O-METER COMPANY, OF CHICAGO, ILLINOIS, A CORPORATION OF ILLINOIS

SCALE

Application filed July 22, 1926. Serial No. 124,253.

This invention relates to scales for weighing individuals and particularly that type of scale which has come to be popularly known as a bathroom scale.

In general the scale casing is made relatively low and is provided at its top with a scale platform with a recording dial arranged so that the individual to be weighed can easily step upon the platform and, looking down, glance into the scale dial to view his recorded weight. A rack bar is mounted on a casing to shift in a horizontal plane and to actuate the dial pointer as it reciprocates. This rack bar is connected to the upper end of a bell crank lever pivotally mounted on the casing and the other arm of the bell crank lever is connected to the vertically rising and falling scale platform. But, due to the fact that the scale platform rises and falls in a somewhat arcuate path because of its pivotal parallel lever mountings and due to its bell crank lever connection to the rack bar as the platform descends under weight, it is noticeable that the scale pointer gains in some portions of the complete revolution of the scale pointer and loses in other portions of such travel. So, also, it is noticed that when an individual steps unevenly upon the scale platform so as to twist or put a lateral thrust upon the top of the platform, this thrust tends to create a multiplied lateral shifting in the mechanism which connects the scale platform to the recording dial, and this twisting movement, which is not a true weighing movement, is indicated and multiplied on the scale dial as a source of error. One of the objects of my present invention resides in compensating the gain and loss movements of the dial pointer as it passes through a complete revolution of the scale dial during the fall of the scale platform under weight by mounting the bell crank lever with its vertical arm normally disposed to one side of a true vertical line passing through the pivotal point of the bell crank lever and arranging this lever so that the upper arm thereof, which is connected to the rack, will shift equal distances on each side of the true vertical line, such as 82 in Figs. 3 and 10 of the drawings, from initial position of the platform to completely depressed positions corresponding to zero and 360 degrees on the scale dial.

Another object of my invention resides in providing means for adjusting the initial or normal position of this vertical arm of the bell crank lever relative to this vertical line 82 whereby the undesirable gains and losses indicated by the pointer's arcuate travel about a complete revolution of the scale dial are adjustably distributed so that any gain or loss in any particular quadrant will not be marked and the one will compensate for the other.

Yet another object of my invention resides in providing a novel type of bell crank lever to be used in scales of the foregoing type as the connecting means between the rack bar and the scale platform which bell crank lever is formed in an economical manner and to provide an adjustment for changing the initial position of one arm of the lever with relation to a line passing through the pivotal axis of the bell crank and passing at right angles to the plane of operation of the rack bar.

Yet another object of my invention resides in providing a novel construction of bell crank lever for forming the connection between the rack bar and the scale platform, which bell crank lever is constructed and arranged so that the angle between the arms may be varied for the purpose hereinafter described.

Another object of my invention resides in providing an improved construction of the scale of the type described wherein the connection from the scale platform to the bell crank lever is such as to eliminate the errors which heretofore were recorded on the scale dial due to the lateral twisting of the scale platform when an individual stepped unevenly upon the platform.

Yet another object of my invention resides in means for providing an adjustable connection between the bell crank lever and the scale platform whereby the angular connection between the bell crank lever and the scale platform may be adjusted to correct errors relating to gain and loss in the arcuate movement of the scale pointer.

Yet another object of my invention resides in providing the bell crank lever, which connects the rack bar to the scale platform, with a knife edge contact adapted to engage the scale platform so that when the platform is depressed under weighing operation and moves outwardly in a slightly arcuate path due to its pivotally mounted arms forming a parallelogram, by reason of this knife edge contact, the length of the lower arm of the bell crank is not increased, as it would be if for the knife edge there were substituted a relatively broad or blunt surface upon which the platform could roll or shift as it moved outwardly and downwardly.

Yet another object of my invention resides in an improved means for maintaining the recording scale dial in substantially horizontal position and for preventing the edges thereof from curling upwardly.

Yet another object of my invention resides in an improved type of recording dial and particularly to the markings thereon indicating the divisions into which the periphery of the scale is marked.

Yet another object of my invention resides in the manner of mounting the transparent glass on the face of the dial so as to prevent the entry of moisture and dust.

Numerous other objects and advantages of the invention will be apparent as it is better understood from the following description, which, taken in connection with the accompanying drawings, discloses a preferred embodiment thereof.

Referring to the drawings,

Fig. 5 is a section on line 5—5 of Fig. 2;

Fig. 6 is a sectional view of the dial mounting;

Fig. 8 is a modified view of my improved dial mounting;

Figures 3, 7:
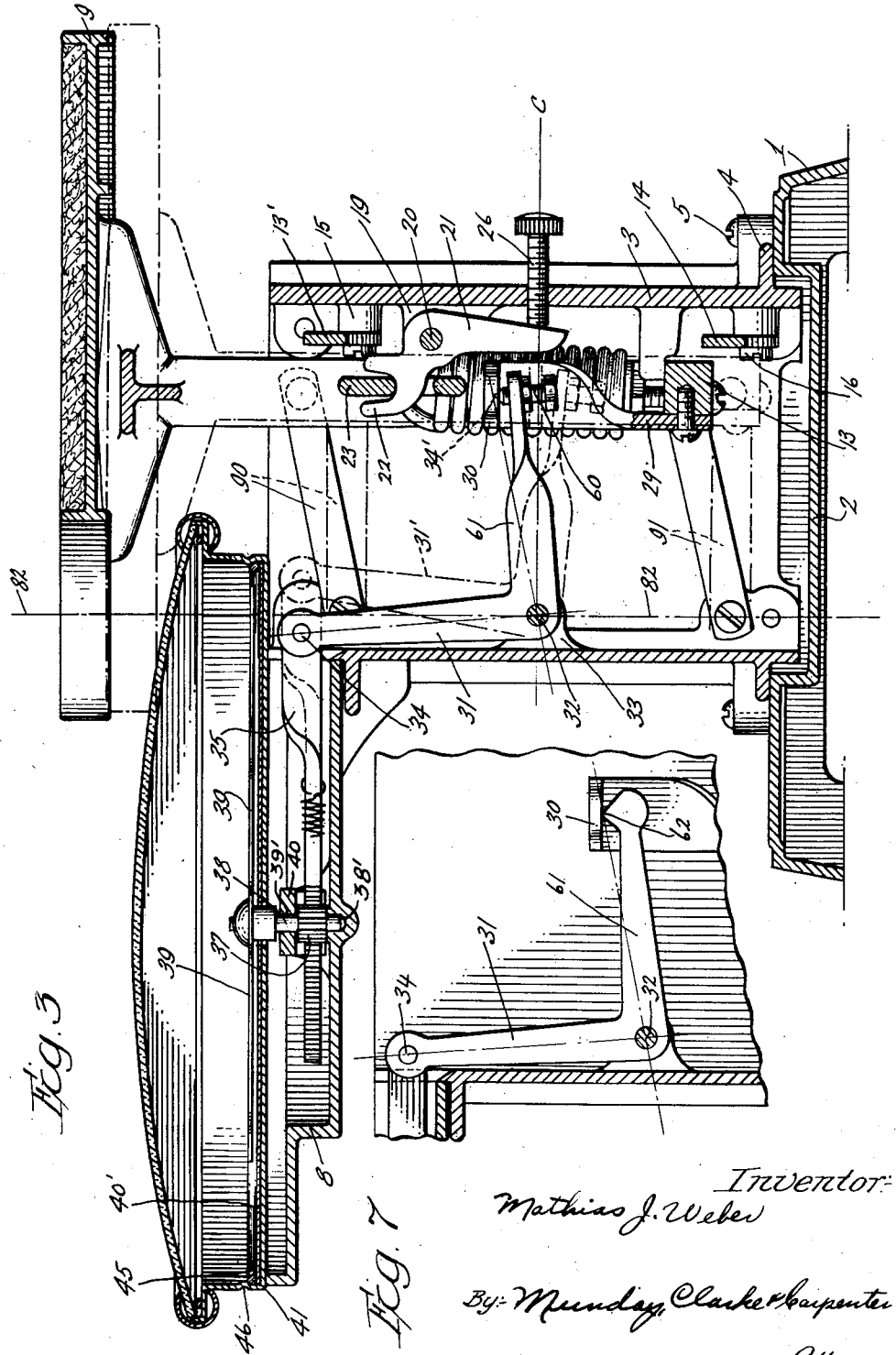
Fig. 3 is a view on line 3—3 of Fig. 1.
Fig. 7 is a detailed view of one form of my bell crank lever.
Figure 4:
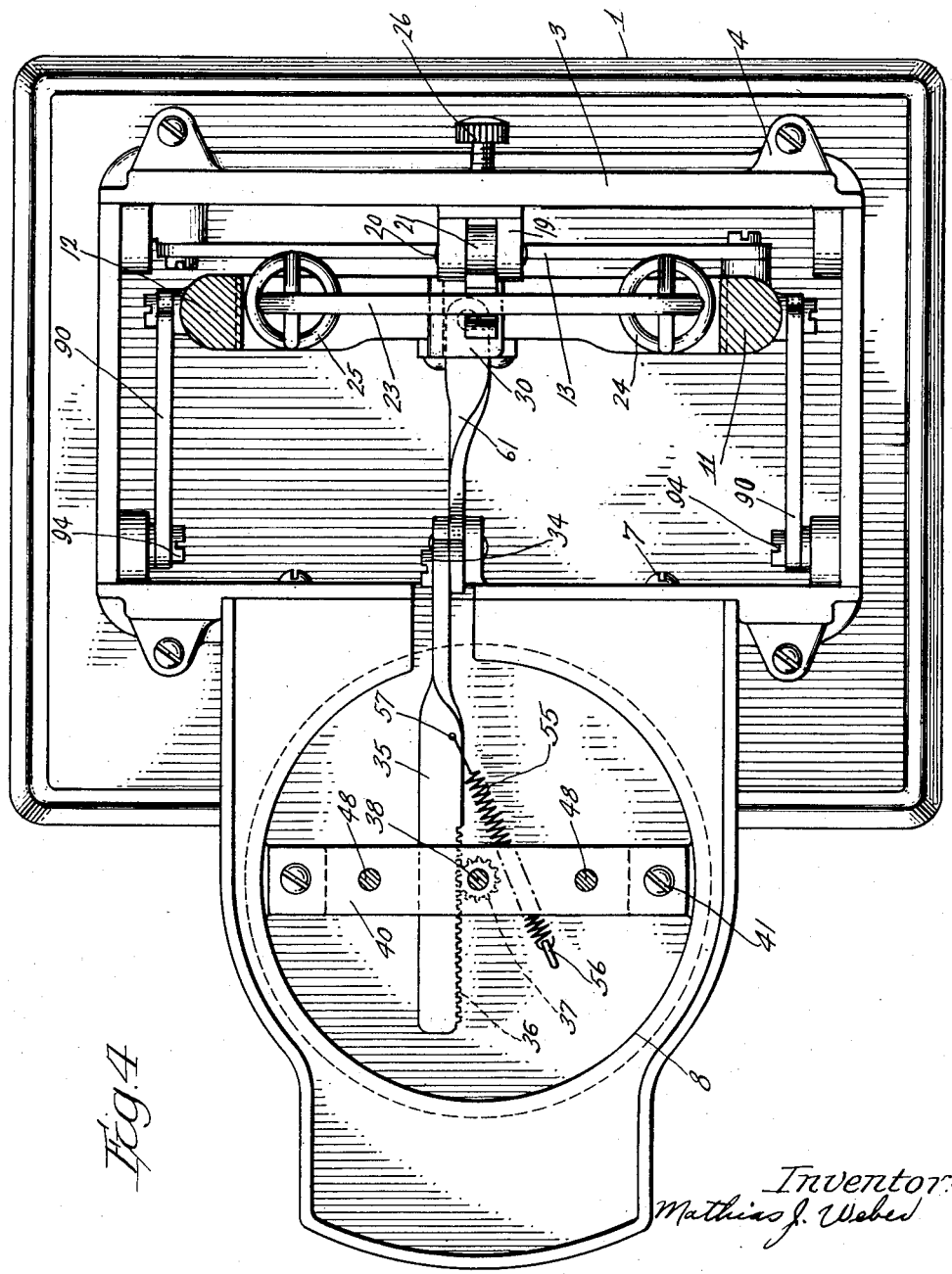
Fig. 4 is a plan view with certain parts broken away to show the interior mechanism.

Referring now to the drawings in detail, my improved scale embodies a base 1 which may be of metal casting provided with a downwardly depending, centrally recessed portion 2 into which fits the upstanding, substantially rectangular casing 3 provided with lateral fins 4 through which bolts 5 pass into the base 1 whereby the upstanding casing 3 is bolted to the base. In this manner the open ended base is closed at the bottom. The upper end of the casing 3 is open and is provided at one side with a horizontally disposed extension 6 bolted to the casing 3 in any desired manner, as by the bolts 7. This extension is dished, as at 8, to receive certain operating parts hereinafter described. The scale platform 9 closes the upper open end of the case 3. This scale platform is provided with a depending, substantially rectangular frame 10 of skeleton formation, which frame 10 is provided with the two parallel vertical legs 11 and 12 and a lower horizontal leg 13. This frame is mounted to shift substantially vertically in the casing 3 by means of two parallel arms 13' and 14 which are pivotally mounted as at 15 and 16 to the side of the casing 1. The opposite ends of these levers 13' and 14 are pivotally connected as at 17 and 18 to the frame 9. It will be noted that by reason of the parallel arms 13' and 14 and the pivotal mounting on the base 1 and frame 9 that when the scale platform 9 is depressed it will not move in a truly vertical plane but will shift outwardly in a slightly arcuate path as it falls or rises during the weighing operation. This lateral shifting movement is indicated by dotted lines in Fig. 3. A bracket 19, carried by the casing 3, has a pivotal pin 20 upon which is pivotally mounted a lever 21 the upper end of which is bifurcated to engage in the eye 22 of a yoke 23, the free ends of which are provided with apertures into which hook the upper ends of coil springs 24 and 25. The lower end of lever 21 is engaged by a threaded adjusting screw 26 which passes through the casing 3. The lower ends of the coil springs engage adjusting blocks 27 externally threaded so that they can adjustably engage the coils of the springs, and these blocks 27 are provided with adjusting screws 28 engaging through bores in the horizontal member 13 of the platform frame. This same transverse bar 13 carries an upstanding arm 29 which is bent at its upper end at right angles to provide an overhanging ledge 30, and this ledge 30 connects with the lower arm of a bell crank lever 31 pivotally mounted at 32 upon a lug 33 carried by the frame 3. The upper arm of the bell crank lever is pivoted as at 34 to a rack bar 35 horizontally mounted to project into the dished member 8 of the extension and the teeth 36 of this rack engage a pinion 37 on a shaft 38 mounted in bearings 39' carried on a cross bar 40 which extends across the dished portion 8 and is held in place by screws 41 passing through upstanding lugs on the bottom of the dished plate 8. The bottom of the shaft 38 enters into a socket 38' made integral in the bottom of the dished portion 8 of the extension. The upper end of the shaft 38 is provided with a pointer 39 which passes over calibrations on a scale 40' which in turn is mounted in a scale pan 41. This scale pan rests upon the dished portion 8 of the extension and projects over the same quite a distance at the side. The scale pan 41 is provided with an upstanding peripheral flange 42 in turn provided with an upper horizontal flange 43 terminating in a free upstanding edge 44. As indicated in Figs. 3 and 6 of the drawings, the calibrated scale dial 40' is securely held in position by means of a split ring 45 which is held in position by means of indented tits 46 on the sides of the upstanding flange 42. This construction permits the slightly convexed scale dial 40', which may be made of sheet metal, to be inserted and pressed down from an original bowed position, as shown in dotted lines 47 (Fig. 6), to a substantially flat position and held in such flat position by means of two screws 48 which pass through apertures in the scale dial and scale pan and extend into the cross bar 40. By means of this arrangement the two screws 48 hold the scale dial 40' in position and the split wire 45 prevents the edge from curling.

As a modification of this construction it is proposed, as shown in Fig. 8, to construct the scale dial 49 with a slightly bent, downwardly turned, peripheral lip or flange so that when the scale dial is screwed home against the bottom of the scale pan 41 the screw 50 will draw this lip or flange 51 tightly against the pan 41 to prevent the curling. In this construction the scale dial 49 is not originally bowed or convexed.

Figure 1:
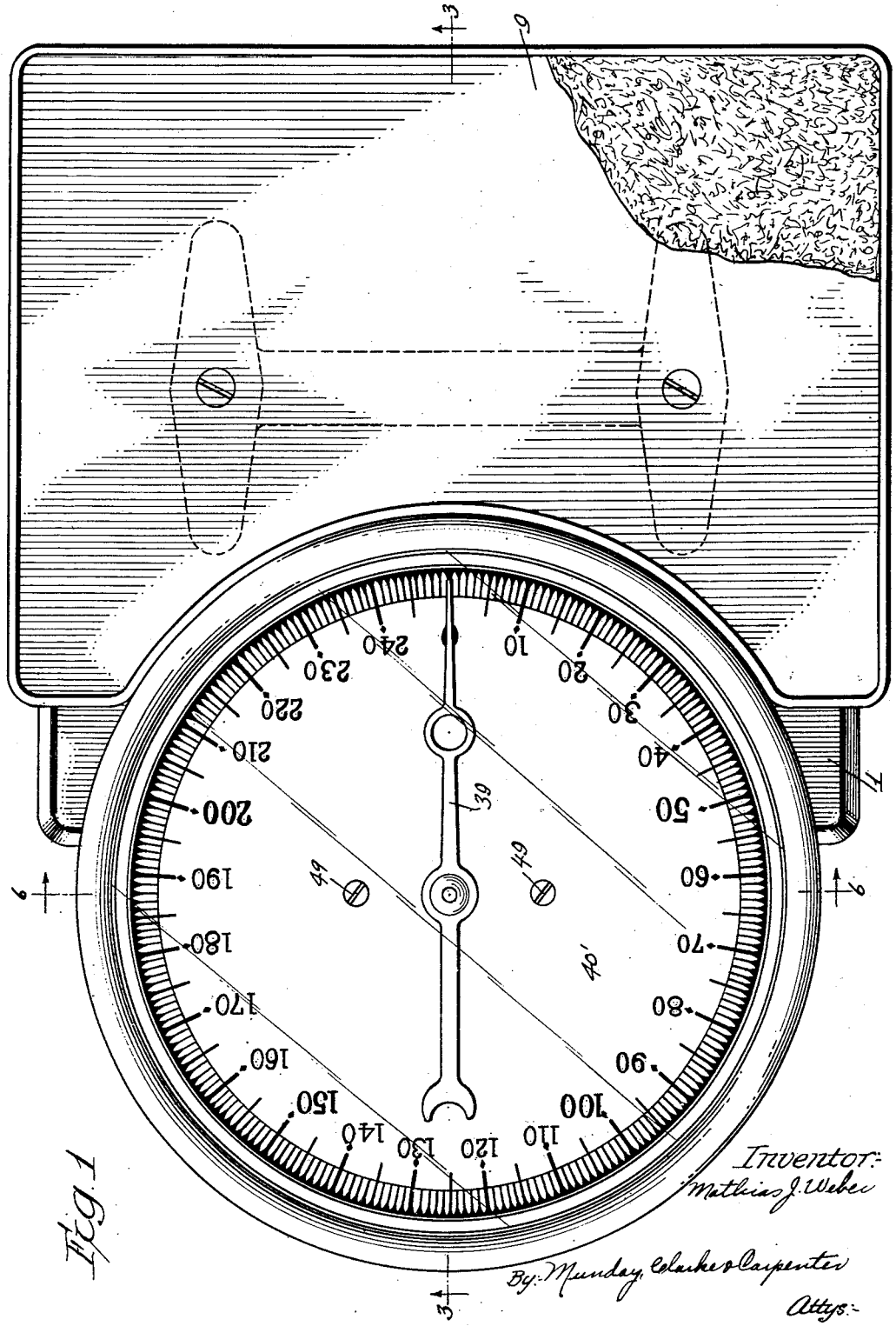
Figure 1 is a plan view of my improved scale.

One of the features of my invention resides in arranging the indicia and calibration of the scale dial 41, as shown in Fig. 1 of the drawings wherein the main divisions such as 0, 10, 20 and 30 include inwardly projecting black lines, and the intermediate divisions such as 2, 3 and 4 are relatively shorter inwardly projecting black lines, and the 5, 15, 25, and so on, are relatively long inwardly projecting black lines but are not as heavy as the 10, 20, 30, 40 and so on divisions. In addition, the extreme outer portions of the divisional black lines are curved outwardly to meet whereby there is formed between each divisional line a white space the outer portion of which is pointed. By means of this construction, when the dial arm, which is also pointed, overlies one of the white spaces, the point at which it lies is very readily distinguished from a standing attitude on the scale. I also propose to close the top of the scale with a convexed glass 52 which lies in the upstanding lip 44 of the scale pan against the gasket or packing 53 and is held in place by a split annular ring 54 engaging over the glass 52 and under the horizontal flange 43 whereby to exclude moisture and dust.

The rack bar 35 is held constantly in mesh with the teeth of the pinion 38 by means of a coil spring 55 which is anchored as at 56 to the dished portion 8 of the extension and is connected to the rack bar as at 57. By this means when the rack bar is moved toward the platform and as the point 57 moves farther away the tension of the spring will be increased and will thereby compensate for the shifting of point 57 farther away from the pinion 38.

By reference to Figs. 3 and 7 it will be noted that the upper arm of the bell crank lever 31 is arranged normally to one side of a vertical line 82 passing through the pivotal point 32 of the bell crank lever and at right angles to the line of movement of the rack bar 35. The dotted line of the bell crank lever, indicated as at 31' of Fig. 3, is shown in its opposite shifted position, that is, to indicate the extreme depressed position of the scale platform 9. In this position it will be noted that the upper arm of the bell crank lever lies on the opposite side of this beforementioned vertical line 82 passing through the pivotal point 32, a distance equal to the angle which the bell crank lever 31 makes with the line 82. In other words, the upper arm of the bell crank lever 31 lies on one side of this vertical plane when the platform 9 is in extreme raised position. As the platform 9 descends its full distance to correspond with a complete rotation of the dial pointer the arm of the bell crank lever 31 will move across the vertical line 82 and will take up a position on the opposite side thereof equal to that which it originally had on the first side thereof. This disposition and arrangement of the bell crank lever is necessary to compensate for the arcuate lateral shifting movement of the platform 9 as it is depressed, and which is due to the parallel, pivotal levers 13' and 14 which force the platform 9 to take this movement. In explanation of the positioning of the upper arm of the bell crank lever 31 and of the adjusting screw for the bell crank lever, let us consider the upper arm of the bell crank lever 31 in its normal position as coincident with the line 82 Fig. 3. Then when the platform scale 9 is depressed to its full extent to correspond to a complete rotation of the scale pointer, the pivotal point 34 connecting the bell crank with the rack 35 would move away from the line 82 in a circular path and away from the plane of the rack, it being noted that the rack lies theoretically tangent to the circle, the axis of which is the pivotal point 32 and the radius of which is the upper arm of the bell crank lever 31. The rack 35 is tangent to this theoretical circle at the vertical line 82. The point 34 must move in the arc of a circle about the axis 32 as the bell crank shifts to the right, as in Fig. 3, and in so moving the pivotal point 34 follows this arc of a circle but at the same time moves away from the horizontal line of movement of the rack 35. Since the point 34 moves away from this tangent line of the rack 35, starting from the line 82 it does so at a progressively increasing rate, and since this motion is lost motion in so far as the true horizontal movement of the rack is concerned the true speed of the rack is progressively lessened and thereby decreased. But in my improved construction where the upper arm of the bell crank lever is initially positioned on one side of this line 82 a distance equal to its extreme opposite position on the other side of line 82 in the lowered position of the platform, the total movement of the platform when depressed to correspond with a complete rotation of the dial pointer will carry the pivotal point 34 from a position on the left side of the line 82 to an equal position on the right side of the line 82, thereby combining a progressively increasing speed of the rack bar with the heretofore mentioned and reversed progressively decreasing speed of the rack bar. This is due to the fact that the hereinbefore mentioned action of the rack bar on the right side of the line 82 is exactly the reverse of the action on the left side of the line 82.

In scales of this type the dial is preferably printed with uniform spacing or calibrations, that is, each degree or fraction of a degree of revolution may indicate a uniform weight throughout the entire circumference of the dial and all springs do not record uniform weight per degree of opening movement, so that by adjusting the arm 31 relative to the line 82, movement of the dial pointer or indicator can be varied to compensate for the irregular movement of the spring, this being accomplished by adjusting the normal position of the arm 31 toward the line 82 when a slightly decreasing movement of the indicator is required or by adjusting it away from the line 82 when a progressively increasing movement of the indicator is required and in this manner the gain or loss in movement of the indicator around the dial may be controlled to compensate for such gain or loss in accordance with the variations of the springs so as to give a correct reading at all times.

My improved feature of this invention resides in providing means for adjusting the position of the upper arm of the bell crank lever so that it will initially lie a lesser or a greater amount to one side of the line 82 whereby adjustably and predeterminedly to alter the ratio of this progressively increasing and progressively decreasing speed of the rack bar as the scale pointer travels around the complete arcuate surface of the dial. In the present preferred instance this means consists in providing the lower arm of the bell crank lever 31 with an adjusting screw 60 which threads through an aperture therein and is provided with a point 34' to engage the under surface of the horizontal lug 30 formed on the bracket or arm member 29. It will be noticed that this point engages arm 30 at a point on the line 61 so that the point of contact of this screw determines the angle of the bell crank lever and not the lower arm of the bell crank lever itself, so that adjusting the screw 60 inwardly or outwardly this point of contact relative to the lower arm of the bell crank lever is changed and thereby the position of the upper arm of the bell crank lever is correspondingly changed.

More clearly to point out the results obtained by means of the adjusting screw 60 for adjustment of the position of the arm 31, four diagrammatic views (Figs. 9, 10, 11, and 12) have been shown that will now be described.

Figure 9:
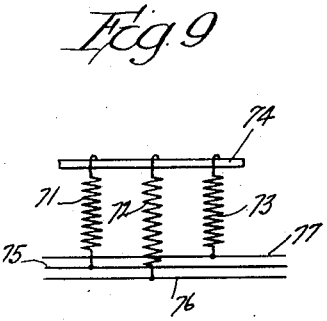
Figs. 9, 10, 11 and 12 are diagrammatic views illustrating the action and relative movements of a device embodying my invention.

Springs 71, 72, and 73 are shown in Fig. 9 as suspended from a common support 74. These springs represent or illustrate the usual variation in springs of this type that may be due to inaccuracies in manufacturing the spring, such as variations in the diameter of the spring wire, the diameter of the coil of the length thereof and variations in the heat treatment and tempering. A like variation is also noticed in such a spring under different conditions of temperature. The spring 71 represents the ideal condition of a spring manufactured exactly in accordance with the design so as to have a given extension under a given load. If a predetermined weight is applied to each of the springs 71, 72 and 73, the perfect spring 71 will be extended to a line 75. The spring 72 represents the same type of spring where a slight error in the manufacture as above mentioned causes the spring to extend a greater length under the given load and to a line 76. The spring 73 is a similar spring where the conditions of manufacture do not permit the spring to extend to the line 75, but to a line 77, under a given load. From the above it will be evident that for many reasons the extension movement of a spring may vary considerably because of various manufacturing conditions. The adjusting blocks 27 are provided roughly to compensate for this variation, but this means 27 is not capable of fine adjustment and, therefore, other means is provided for making this adjustment. Another action which is common to springs of the type shown is that while a spring may be designed to have a given and uniform extending movement for each additional pound of force applied, on account of manufacturing conditions as above mentioned, the spring may vary from the design so as to have a progressively decreasing unit of travel per pound of applied force. This cannot be compensated for by the adjusting blocks 27 and is compensated for by the adjusting screw 60, or by controlling the operating range of the arm 31. This adjusting screw is also the means for making the fine adjustment above mentioned in connection with the adjusting block 27.

Figure 10:
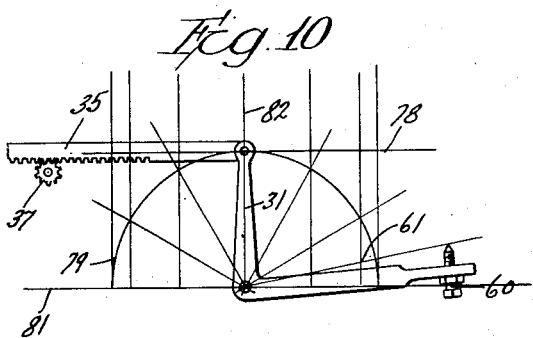
Figure 11:
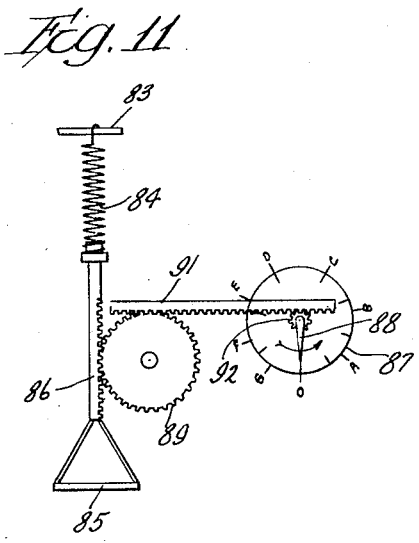
Figure 12:
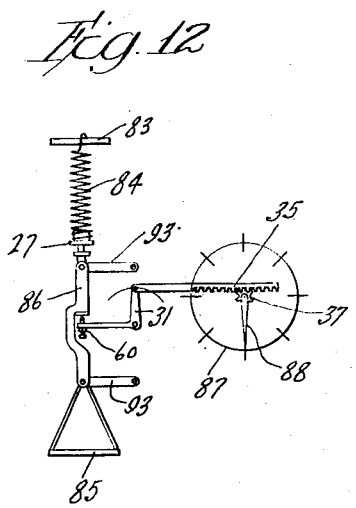

The relative movement of the rack 35 and the upper arm of the bell crank lever 31 is diagrammatically illustrated in Fig. 10. A line 78, represents the plane of effective movement of the rack 35, that is, movement of the rack that will cause rotary motion of the scale indicator through the pinion 37. The circular line 79 represents a possible arc of movement of the point of connection of the upper arm of the lever 31 and the rack 35. To illustrate the relative movement of the rack 35 and to exaggerate so as to make the description clear, I have shown this line 79 including 180 degrees about the pivot of the lever 31 and divided into segments of 30 degrees each. A line is drawn perpendicular to a line 81 which may represent a base and through the point of intersection of each of the lines dividing the line 79 into 30 degree segments. The space between these lines represents the horizontal or effective movement of the rack 35 for 30 degrees of movement of the lever 31 and illustrates that the maximum movement of the bar 35 is obtained when the range of movement of the upper arm of the lever 31 is equally divided on each side of the line 82 which is a line perpendicular to the line 78 or at right angles to the plane of effective movement of the rack 35. These spaces also illustrate that at all times there will be a progressively increasing rate of movement of the rack as the arm approaches the line 82 from the left and a progressively decreasing rate of movement as the arm moves away from the line 82 toward the right. This progressively increasing and decreasing movement is determined by the length of the upper arm of the bell crank 31 which may be constructed of sufficient length to make this movement ineffective throughout a relatively short arc of movement equally divided by the line 82 and may be increased or decreased since the progressively increasing movement of the rack 35 is controlled by the movement of this arm on the left side of the line 82 and the progressively decreasing movement is controlled by the movement of the arm on the right side of the line 82, it will be evident that by changing the range of movement of the arm 31 so as to include more movement on the left side of the line than on the right the indicator will have a corresponding change of movement, that is, a progressively increasing movement in accordance with the extent of the change. A similar opposite result will be effected by shifting the range of movement toward the right. This shifting of the range of moveotally mounted as at 17 and 18 by means of the screw 60 which changes the effective angle between the upper arm of the lever 31 and the lower arm which may be represented by the line 61, and it will be noted that by constructing the lever 31 as shown it is possible to obtain a wide range of progressively increasing or progressively decreasing movement of the indicator, since the upper arm of the lever 31 may be shifted to operate entirely upon either the left or the right side of the line 82 and at a considerable distance therefrom if desired to obtain a greater progressively increasing or decreasing movement of the indicator.

To illustrate the effect of variations in the springs as explained in connection with Fig. 9, a diagrammatic scale, motion transmitting devices, and indicator are shown (Figs. 11 and 12). 83 indicates a support, 84 a spring, 85 a scale platform suspended from or attached to a link 86, which may be any connecting link or frame part of the scale, and a dial 87 and indicator 88.

The devices shown (Fig. 11) illustrate the relative motion of the indicator 88 when mere motion transmitting devices are used to transmit motion from the link 86 to the indicator 88, and when a spring such as the spring 72 or 73 is used. Motion transmitting devices for transmitting motion without alteration may be a gear 89 arranged to mesh with suitable teeth on the link 86 and with a rack 91 that is extended to mesh with a pinion 92 carrying the indicator 88. In this arrangement, when a spring such as the spring 72 is used, that is, a spring which gives a progressively increasing movement per unit of weight applied, the units of weight would be represented by the lines extending inwardly from the circle representing the dial, that is, when the dial is constructed to indicate, for example, 80 pounds or 800 pounds the marks extending inwardly from the circle would represent divisions of 10 pounds or 100 pounds, respectively, and it would be necessary to print the dial in accordance with the movement of the indicator 88. Similarly, when a spring having a progressively decreasing movement per unit of weight is used, the units of weight would be represented by the lines extending outwardly from the circle indicating the dial 87. And it will be noted that the conditions are exactly reversed, that is, the 10 pounds would be represented by a relatively short space under one condition and by a relatively long space under the opposite condition. Since it is impossible to print a dial to conform to both conditions, it is necessary to adjust the rate of movement of the indicator 88 to compensate for the variation or irregular movement of the spring, that is, when the tendency of the spring is to progressively increase, the motion of the indicator is controlled to progressively decrease in accordance and offset this movement of the spring, and vice versa.

A diagram is shown (Fig. 12) which illustrates my present invention. The adjusting block 27 is provided as above mentioned to take up the rough or large variations of the spring 84, the link 86 that carried the platform 9 is connected to a pair of parallel links indicated at 93, and the arm of the lever 31 carrying the adjusting screw 60, being of substantially the same length as the links 93, produces the effect of a mere motion transmitter since at the same time the arm of the lever 31 moves about its pivot, the links 93 move about their pivot so as to keep the leverage constant, and by adjusting the screw 60 the range of movement of the upper arm of the lever 31 may be varied as illustrated in Fig. 10 to impart a progressively increasing or progressively decreasing motion to the indicator 88 through the rack 35 and pinion 37 to the extent necessary to compensate for the maximum possible variations of the springs and the motion of the indicator may thereby be controlled so that the dial may be divided into an equal number of spaces and each space may represent an equal number of units of weight.

Figure 7 of the drawings shows a modified form of my bell crank lever which has no adjustment but which is provided with a knife edge which takes the place of the point of the adjusting screw 60. This point 62 engages under the horizontal ledge 30 on the arm 29 carried by the platform frame. In reference to this knife edge and also the knife edge formed by the point 34' of the screw 60, it might be stated that due to the fact that the levers 13' and 14 are arranged parallel and also to the fact that the lower arm of the bell crank 31 is substantially parallel to these arms 13 and 14 and also of a substantially equal length thereto, when the platform 9 is depressed the flat under surface of the ledge 30 will merely rock upon the knife point because of the equal length of the lower arm of the bell crank 31 and the levers 13 and 14 and will not tend to slip therealong so that the length of the lower arm of the lever 31 will be maintained approximately the same with respect to the under surface of the ledge 30. In prior constructions, where the knife edge is replaced by a rounded or square portion, in the depression of the platform 9 this rounded portion would roll or rock over the under surface of the ledge 30, thereby presenting a new surface and thereby altering the effective length of the lower arm of the lever of the bell crank 31. This of course would be true also of a square arm in lieu of the knife edge.

Figure 2:
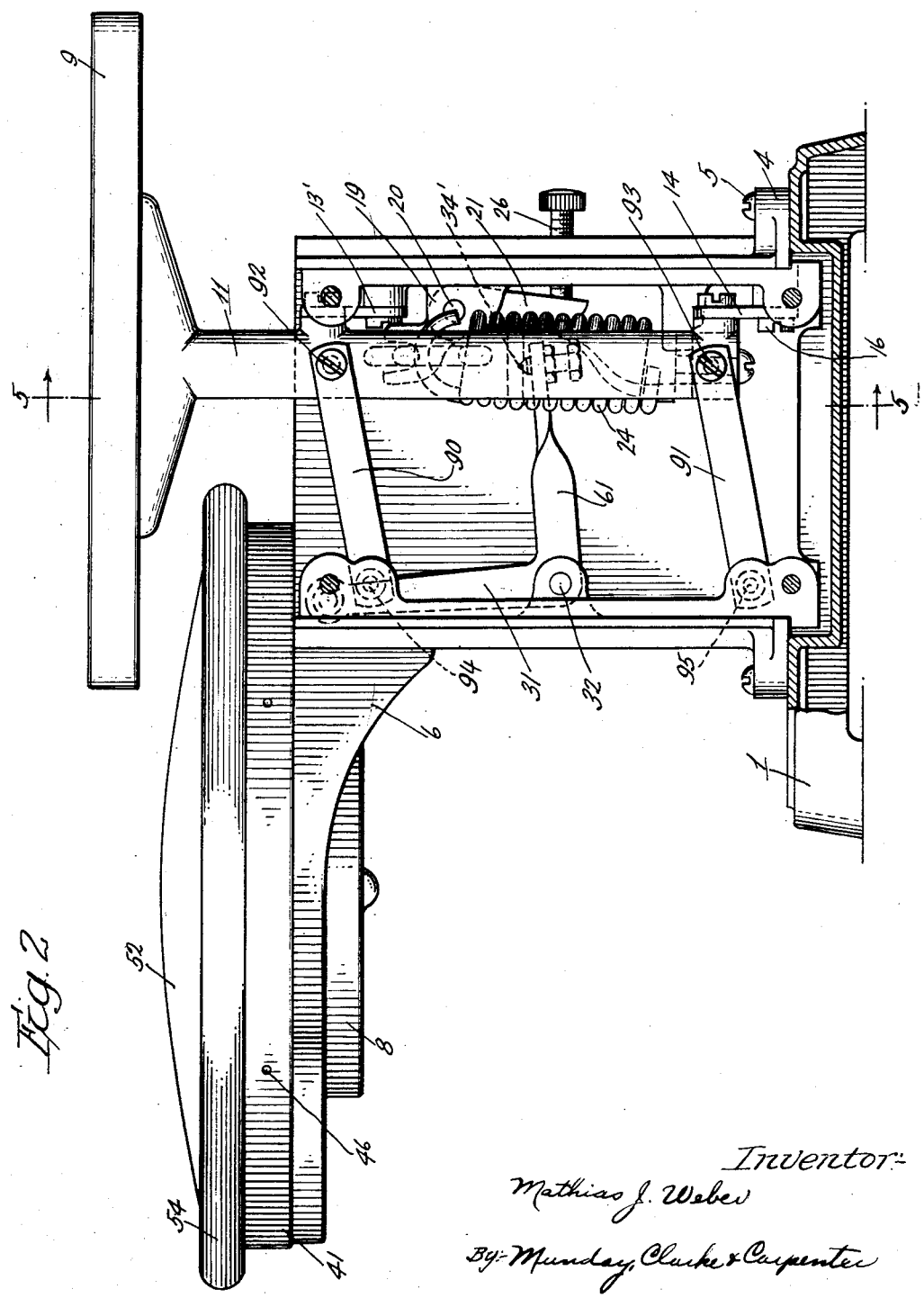
Fig. 2 is a side view with certain parts broken away to show the interior mechanism.

By reference to Figures 2 and 5 it will be seen that in Figure 5 the frame 11 is pivotally mounted as at 17 and 18 by means of the arms 13' and 14 to the scale support 3 at the points 15 and 16. By reference to Figure 2 it will also be seen that this frame is pivotally mounted to the support in a direction transverse to the frame by means of arms 90 and 91, the upper arm 90 being pivotally mounted as at 92 to the frame 11, and the lower arm 91 being pivotally mounted as at 93 to the frame 11. The other end of the upper arm 90 is pivotally mounted to the support as at 94, while the lower arm 91 is pivotally mounted to the support as at 95. This mounting provides a parallelogram-shaped arrangement of lever arms, so that when the scale descends, while it is a substantially vertical movement, it also tends to shift slowly arcuately. It will also be noted that the bell crank lever 31, which is pivoted as at 32, has its lower arm 61 connected as at 34' to the horizontal bar 30 of the frame, which bar is located midway between the pivotal points 92 and 93. It will thus be evident that should the person to be weighed step upon either the extreme lefthand side or extreme righthand side of the scale, the tendency of the scale frame to twist in that particular direction will not impart a deflecting or twisting movement to the adjusting screw 34' of the extreme end of the parallelogramed lever 61, since this is located at substantially the vertical center of the depending frame 11 of the platform. This would not be true if the connection of the arm 61 were disposed closer to the lower pivotal connection at 93 between frame 11 and lower lever 91, since in that case if the frame were twisted either to the right or left, as viewed at Figure 2, the lower portion of the frame 11 would be increasingly shifted in the opposite direction in corresponding amount, which deflection would be multiplied in the arm 61 in the bell crank lever so that it would show on the indicator dial. This disposition of the connection between the lower arm 61 of the bell crank lever at an intermediate point on the frame so as to eliminate communicating twisting movement of the frame to the indicating mechanism is an important feature of my invention.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a weighing scale, the combination of a base, a platform mounted thereon and vertically shiftable thereto, an indicating mechanism on said base, a rack bar for shifting said indicating mechanism and means interconnecting said rack bar and said shiftable platform for indicating the weight when said platform is shifted under the influence of a weight, said means including adjustable devices for compensating the gain and loss movements of the indicating mechanism as it passes through its complete movement corresponding with the full extent of movement of the platform.

2. In a weighing scale, the combination of a base, a platform mounted thereon and vertically shiftable relative to said base, an angularly movable indicating mechanism on said base, a rack bar for angularly moving said mechanism, a bell crank lever connecting said rack bar to said platform, and adjustable devices for altering the relative position of said bell crank and its connections with said rack bar to platform for compensating the gain and loss movements of the indicator during the weighing operation.

3. A scale comprising, weighing mechanism, an indicator, a rack and pinion drive for said indicator, a pivoted arm attached to said rack and adapted to transmit motion from said weighing mechanism to said rack and means for adjusting the normal position of said arm relative to a line extending at right angles to the rack and passing through the pivot of said pivoted arm whereby to regulate the movement of the indicator.

4. In a scale of the class described, the combination of a base, a platform vertically shiftable thereon, an indicating mechanism including an angularly movable member, a rack bar for shifting said member, a bell crank lever connected to said rack bar and said platform and adjusting devices for adjusting the initial position of one arm of said bell crank lever whereby to cure undesirable gains and losses indicated by the travel of the indicator.

5. A device of the class described, the combination of a support, a platform shiftably mounted thereon, an angularly movable indicator, a rack bar for moving said indicator, a bell crank lever pivotally mounted on said support and having one arm pivoted to said rack bar, the other arm of said bell crank lever having a member adapted to contact said platform, said latter member being adjustable.

6. A device of the class described, the combination of a support with a platform shiftably mounted thereon, an angularly movable indicator on said support, a rack bar for moving said indicator and bell crank lever pivotally on said support and having one arm pivoted to said rack bar, the other arm of said bell crank lever having an adjusting screw passing therethrough adapted to engage the platform.

7. A device of the class described, the combination of a base, a platform shiftably mounted thereon, an indicator on said base, a rack bar for angularly moving said indicator, a bell crank lever pivotally mounted on said base to swing in a vertical plane and having one arm pivotally connected to said rack bar, the other arm of said bell crank lever having a portion thereof twisted to lie in a horizontal plane, a threaded adjusting screw passing through said twisted portion and adapted to contact with the under side of a portion of the platform.

8. A device of the class described, the combination of a base, a shiftably mounted platform thereon, said platform having a member provided with a horizontally disposed face, an angularly movable indicator on said support, a rack bar for shifting said indicator, a bell crank lever mounted on said support to swing in a vertical plane and pivotally connected to one end of said rack bar, the opposite leg of said bell crank lever having a knife edge adapted to engage the under surface of the horizontal member of said platform.

9. In a bathroom scale, the combination of a support, upper and lower levers pivotally mounted on said support, a rectangular frame governed by said upper and lower levers, said rectangular frame being shifted to move substantially vertically, said rectangular frame having a horizontal bar substantially intermediate its head, an indicator dial mounted on said support, a shiftable indicator thereon, a rack bar movable in a horizontal plane to shift said indicator, a bell crank lever pivotally mounted substantially between the pivotal points of said first mentioned levers and shiftable in a vertical plane, the upper arm of said bell crank lever being pivotally connected to said rack bar and the other arm of said bell crank lever being connected to the horizontal intermediate bar of said platform frame.

10. A device of the class described, the combination of a support, a platform, a plurality of levers pivotally mounted on said support and connected to said platform, whereby the latter is free to shift in a substantially vertical plane, an indicator on said platform having an angularly movable indicating member, means for shifting said indicating member including a bell crank lever pivotally mounted on said support, having one arm pivotally connected to said means and the other arm connected to said platform, the connection of said bell crank lever to said platform being disposed at a point on said platform substantially between the point of connection of said platform with said pivotal levers, whereby lateral twisting of said platform is not communicated to said indicator as a weighing inaccuracy.

11. A scale dial of a bathroom type of scale comprising, an indicating face having a circumferential series of inwardly extending main indicating lines separated by a plurality of inwardly extending narrower lines, the spaces between said lines converging to points extending outwardly toward the circumference of the scale.

MATHIAS J. WEBER.